Sept. 16, 1941.   J. W. ENGLER   2,255,767
SPECTACLE MOUNTING
Filed April 5, 1940   2 Sheets-Sheet 1
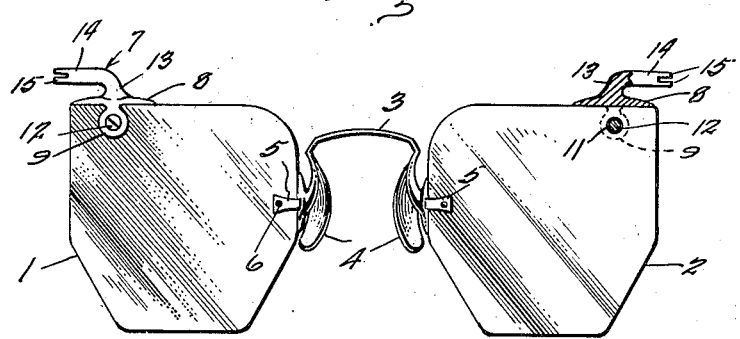
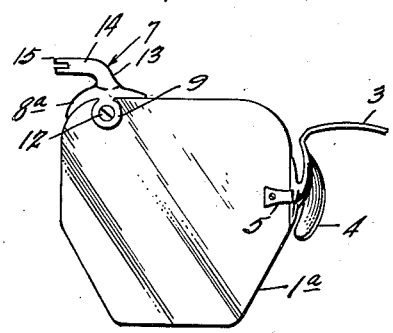
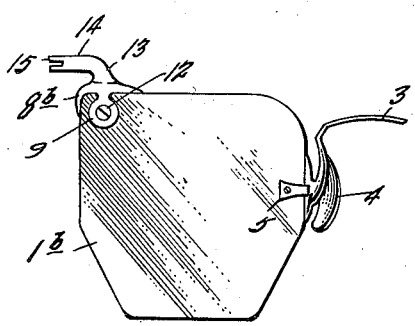
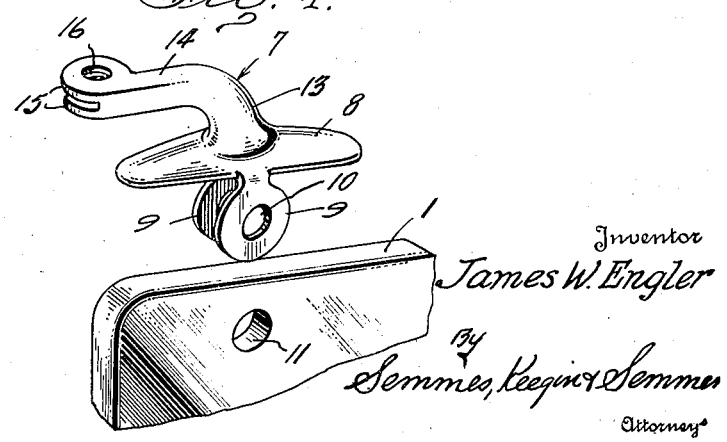
Inventor
James W. Engler
By Semmes, Keegin & Semmes
Attorneys Sept. 16, 1941.   J. W. ENGLER   2,255,767
SPECTACLE MOUNTING
Filed April 5, 1940   2 Sheets-Sheet 2
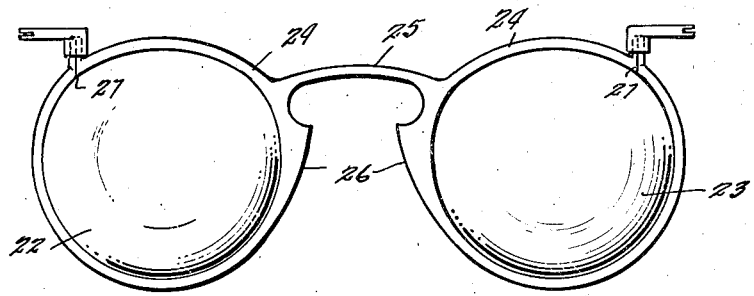
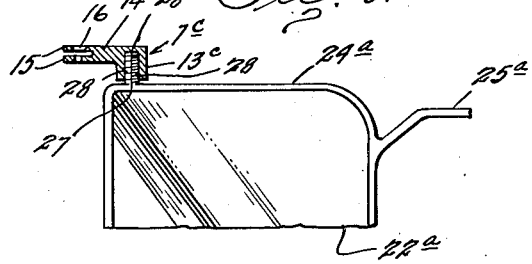 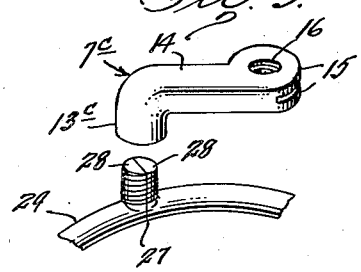
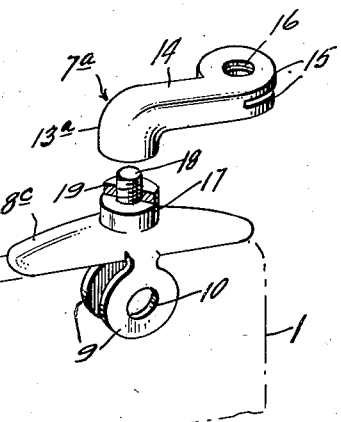 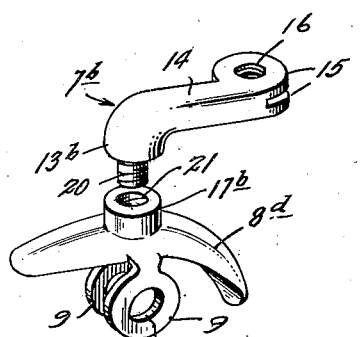
Inventor
James W. Engler
By Semmes, Keegin & Semmes
Attorneys Patented Sept. 16, 1941

2,255,767

UNITED STATES PATENT OFFICE 2,255,767

SPECTACLE MOUNTING

James W. Engler, Atlanta, Ga.

Application April 5, 1940, Serial No. 328,128

3 Claims. (Cl. 88—53)

This invention relates in general to spectacle mountings, and more particularly has reference to a device for attaching temple bars to the upper edges of lenses.

Within recent years, the temple bars of spectacles have been secured to the sides of the lenses or the frames of the latter at points above the center of the lenses. Various improvments and modifications of the devices for mounting the temple bars on the lenses and frames have been made. However, none of the prior art improvements relate to the mounting of the temple bars at the upper edges of the lenses by means of arms of various lengths so that said temple bars can be spaced above the tops of the lenses at various distances to exactly fit the requirements of the wearer.

A major object of this invention is to provide a device for mounting temple bars on the upper edges of lenses with bars spaced above the edges of the lenses.

Another object of this invention is to provide a device for mounting temple bars at varying distances above the upper edges of lenses.

A further object of this invention is to provide a mounting for temple bars and means for adjustably securing said mounting at varying distances above the upper edge of a lens.

Still another object of this invention is to provide a split rim for a spectacle lens with semi-studs carried at the abutting ends of the rim adapted to cooperate when the rim is assembled on the lens to afford a composite stud for receiving a socket member having a temple bar mounting on the upper portion thereof.

With these and other important objects in view, which may be incident to my improvements, the invention resides in the parts and combinations to be hereinafter set forth and claimed, with the understanding that the several necessary elements comprising my invention may be varied in construction, proportions and arrangement, without departing from the spirit and scope of the appended claims.

In the drawings:

Figure 1 is a front elevational view partly in section of a pair of spectacles embodying the present invention.

Figure 2 is a fragmentary front elevational view of a different type of lens equipped with a temple bar mounting according to the present invention.

Figure 3 is a view similar to Figure 2, showing the invention applied to still another type of lens.

Figure 4 is an exploded fragmentary perspective view of the structure of Figure 1.

Figure 5 is a fragmentary exploded perspective view of an adjustable embodiment of the invention applied to rimless types of lenses.

Figure 6 is a view similar to Figure 5, showing a further modification.

Figure 7 is a front elevational view of a pair of spectacles of the rimmed frame type, embodying the present invention.

Figure 8 is a fragmentary front elevational view, partly in section, of a modification of the structure of Figure 7.

Figure 9 is a fragmentary exploded perspective view, showing details of the structure of Figure 7.

In Figure 1 of the drawings I have shown a pair of spectacles of the rimless type comprising lenses 1 and 2 connected together in assembled relation by means of a bridge 3 having nose engaging supporting members 4 and lens gripping and securing lugs 5. The lugs 5 are attached to the lenses in the usual manner by means of screws 6. Other types of bridge constructions may, of course, be used.

According to the present invention, the usual temple bars (not shown) are pivotally mounted in brackets carried by the upper edge of the lenses. As shown in the drawings, brackets 7 are mounted on the upper portions of each lens adjacent the outer side thereof remote from the bridge 3. Each bracket comprises a strap 8 adapted to engage and closely fit the contour of the upper edge of the lens. The strap 8 is held in place on the upper edge of the lens by means of the depending lugs 9 which are carried by opposite edges of the strap. These lugs 9 receive the lens between them and are provided with openings 10 adapted to register with an opening 11 formed in the lens. One of the openings 10 is threaded to receive a screw 12 which, when tightened, securely clamps lugs 9 of the strap 8 onto the lens.

It will, of course, be appreciated that the strap 8 may be secured to the lens by other means than those shown.

Extending upwardly from the strap 8 is an arm 13 which is formed integrally with strap 8 or attached thereto. Arm 13 extends upwardly above the uppermost portion of the lens. From the upper portion of arm 13 there extends a lateral or horizontal portion 14. To the free end of the portion 14 is attached the temple bars (not shown). For this purpose the free ends of the horizontal portions 14 are bifurcated to form a clevis consisting of two spaced ears 15 adapted to receive the end of the temple bar between them. Openings 16 are provided, one of which is threaded in the usual manner to receive a screw (not shown) which serves as a pivot for the temple bar. The mechanism for attaching the temple bar to the free end of arm 14 is conventional structure well known in the art.

It will be realized that the construction just described locates the point of attachment of the temple bars to the arms 14 at a point spaced above the upper edge of the lens. The distance of this point above the upper edge of the lens will vary, depending upon the shape of the wearer's face and the location and size of his features, but will always be such that the wearer's lateral view beyond the outer boundary of the lens will not be obstructed by the temple bar.

In order to vary the distance of the ears 15 above the upper edge of the lens, the arms 13 and 14 may be slightly deformed. It is desirable, however, for the optometrist or optician to have a supply of brackets of different sizes, that is, of different lengths of arms 13 and 14, particularly of different lengths of arms 13. This will enable him to accurately fit all patients.

The brackets 7 are adapted to be used with various types of lenses, irrespective of shape. Figures 1 and 4 show brackets 7 applied to lenses having straight upper edges. In this case the strap 8 is symmetrical.

If the outer upper corner of the lens is rounded, as shown in Figure 2, the strap 8a should be bent to follow the contour of the rounded upper edge surface.

On the other hand, however, the opening 11 may be positioned nearer the outer edge of the lens 1b, as shown in Figure 3, in which case the outer end of the strap 8b is bent down along the outer side edge of the lens to insure full contact of the strap with the lens.

By shaping the strap 8 to the contour of the upper edge surface of lenses, the same can be fitted onto variously shaped lenses.

Instead of resorting to the use of brackets having upstanding arms of varying lengths, it is within the concept of this invention to vary the length of the upstanding arm. Embodiments of the invention having an upstanding arm of variable length are shown in Figures 5 and 6.

Referring to Figure 5, it will be noted that a boss 17 is mounted on the upper surface of the strap 8c. A threaded stud 18 is carried by the boss 17 and is adapted to be threadedly received within a socket (not shown) provided in the bottom end of the upstanding arm 13a. In use, the arm 13a is threaded onto the stud 18 until the lower end of arm 13a abuts the top of the boss 17 or until the ears 15 are the desired distance above the upper edge of the lens.

If desired, washers or shims 19 may be interposed between the lower end face of arm 13a and the upper face of boss 17 to limit rotation of the arm about the stud and to fill up the space between the arm and boss. The device may be used, however, with or without washers.

Although not clearly obvious from the drawings, the threads on the stud 18 and within the socket receiving said stud are of such hand as will tighten, rather than loosen, in use. For instance, there is force exerted by the temple bars to rotate the arm on the lens for the right eye in a clockwise direction viewed from above and the arm on the lens for the left eye in a counterclockwise direction, the thread on the stud of the right eye lens should be right-hand and that on the stud of the left eye lens left-hand.

Instead of the stud being on the strap 8c and the socket formed in the arm 13a, these elements may be reversed, as shown in Figure 6. As shown, arm 13b carries a stud 20 and the boss 17b on strap 8d is provided with a socket 21. The threaded construction and use of the bracket of Figure 6 is identical to that of Figure 5.

The present invention is also applicable to spectacles of the rimmed frame type, as shown in Figures 7 to 9. As illustrated, lenses 22 and 23 are carried in frames or rims 24 connected by bridge 25. The frames or rims 24 have nose engaging elements 26 on their inner edges beneath the bridge 25. Each rim is split at 27 and each end carries an upstanding semi-stud 28. When the lens is placed in the rim and the two ends drawn together, the two semi-studs 28 cooperate to form what appears to be a single composite stud. The composite stud 28 is received within a socket formed in the lower end of an upstanding arm 13c of a bracket 7c. The horizontal portion of bracket 7c is constructed identically to the arms of the embodiments of Figures 1 to 6.

Stud 28 and the socket of arm 13c are threaded and operate in the manner described in connection with Figures 5 and 6.

This embodiment of the invention may, of course, be applied to frames other than those for circular lenses. For instance, it may be applied to frames such as shown in Figure 8, wherein the parts are indicated by reference characters similar to those of Figures 7 and 9.

From the foregoing description, it will be appreciated that the present invention embodies features highly desirable in the art and will prove useful to optometrists and opticians in accurately fitting glasses to various patients.

While I have shown and described the preferred embodiment of my invention, I wish it to be understood that I do not confine myself to the precise details herein set forth by way of illustration, as it is apparent that many changes and variations may be made therein by those skilled in the art, without departing from the spirit of the invention or exceeding the scope of the appended claims.

I claim:

1. A device for mounting a temple bar on a spectacle lens, comprising a relatively short adjustable upwardly extending arm secured in end-abutting relationship to the shoe of a lens strap, means for securing said strap on the upper edge of a lens adjacent the outer segment thereof whereby the upper portion of said arm will be spaced well above the upper edge of said lens, said arm having a horizontal portion extending laterally and outwardly from the upper portion thereof, said horizontal portion extending in a plane generally parallel to that of the upper edge of the lens, and a temple bar mounting carried by the free end of said horizontal portion spaced well above the upper edge of the lens.

2. A device for mounting a temple bar on a spectacle lens, comprising a relatively short upwardly extending arm secured in end-abutting relationship to the shoe of a lens strap, means for securing said arm on the upper edge of a lens adjacent the outer segment thereof whereby the upper portion of said arm will be spaced well above the upper edge of said lens, said arm having a horizontal portion extending laterally and outwardly from the upper portion thereof, said horizontal portion extending in a plane generally parallel to that of the upper edge of the lens, a temple bar mounting carried by the free end of said horizontal portion spaced well above the upper edge of the lens, and means for adjusting the effective length of the upwardly extending portion of said arm to vary the vertical distance of the temple bar mounting above the upper edge of the lens.

3. A device for mounting a temple bar on a spectacle lens, comprising a relatively short upwardly extending adjustable arm mounted in end-abutting relationship to lens-securing means having portions overlying the edge and side surfaces of a lens, means for securing said arm on the upper edge of the lens adjacent the outer segment thereof whereby the upper portion of said arm will be spaced well above the upper edge of said lens, said arm having a horizontal portion extending laterally and outwardly from the upper portion thereof, said horizontal portion extending in a plane generally parallel to that of the upper edge of the lens, and a temple bar mounting carried by the free end of said horizontal portion spaced well above the upper edge of the lens.

JAMES W. ENGLER.